United States Patent [19]
Arai

[11] Patent Number: 6,065,215
[45] Date of Patent: May 23, 2000

[54] CUTTER WHEEL

[75] Inventor: Asako Arai, Osaka, Japan

[73] Assignee: Toyo Sangyo Co., Ltd., Osaka, Japan

[21] Appl. No.: 09/240,604

[22] Filed: Feb. 1, 1999

[30] Foreign Application Priority Data

Aug. 4, 1998 [JP] Japan ................................. 10-220547

[51] Int. Cl.[7] ................................................. B26D 1/14
[52] U.S. Cl. ............................ 30/319; 30/347; 30/351; 83/665; 83/676
[58] Field of Search ........................... 30/319, 347, 351; 83/665, 666, 676

[56] References Cited

U.S. PATENT DOCUMENTS

| | | | |
|---|---|---|---|
| 4,657,428 | 4/1987 | Wiley | 83/665 |
| 4,738,028 | 4/1988 | Belokin et al. | 30/319 |
| 4,809,437 | 3/1989 | Saliaris | 30/319 |
| 5,477,845 | 12/1995 | Zuzelo | 83/666 |
| 5,649,365 | 7/1997 | Yang | 30/319 |
| 5,711,077 | 1/1998 | Schulz et al. | 30/319 |
| 5,765,289 | 6/1998 | Schulz et al. | 30/319 |
| 5,901,629 | 5/1999 | Stroud | 83/665 |

*Primary Examiner*—Kenneth E. Peterson
*Assistant Examiner*—Sean Pryor
*Attorney, Agent, or Firm*—Wenderoth, Lind & Ponack, L.L.P.

[57] ABSTRACT

A cutter wheel which can form a deep slit on an article to be cut so that the article can be broken easily along the slit and a perpendicular cut surface can be formed reliably when the article is broken along the slit. The cutter wheel is a disk-shaped member having a cutting edge along the outer edge and formed with a mounting hole extending therethrough along its axis. The mounting hole has an irregular shape so that the cutter wheel vibrates when it rolls due to steps between adjacent sides of the polygonal hole. The edge of the wheel can thus penetrate more deeply into the glass plate so that a deeper and smoother slit can be formed in the glass plate. This in turn makes it possible to more easily break the glass plate along the slit and to form a perpendicular cut surface.

3 Claims, 3 Drawing Sheets

FIG. 1B
FIG. 1A
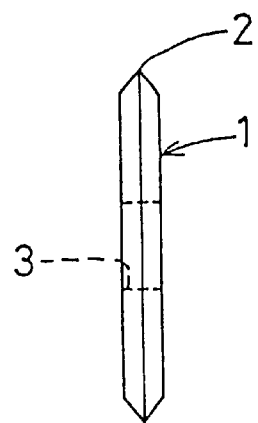
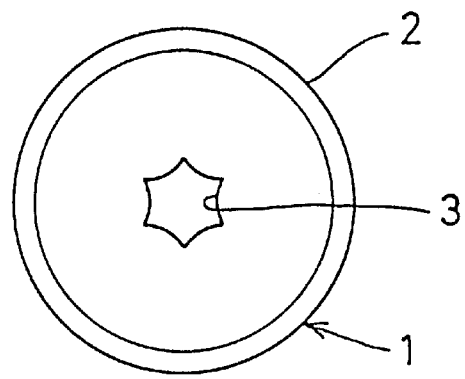
FIG. 1C
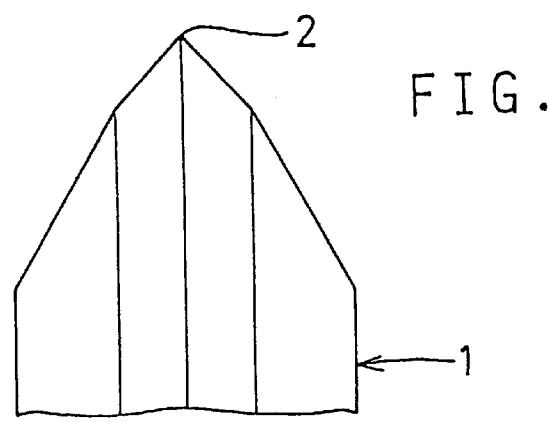
FIG. 2
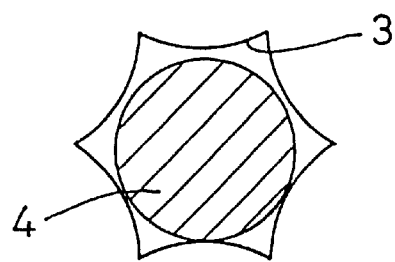

CUTTER WHEEL

BACKGROUND OF THE INVENTION

This invention relates to a cutter wheel for use in a glass cutter or a glass cutting device for cutting a glass plate or a liquid crystal plate.

In order to cut, either manually or automatically, various glass plates such as those used in cars, buildings and industries, glass plates, ceramic glass plates and liquid crystal plates, a glass cutter having a cutter wheel rotatably mounted on the tip of a head member is used to form a slit on the surface of the plate by pressing the wheel against the plate and rolling it thereon. Then, by pushing down the plate on both sides of the slit, the plate can be cut along the slit.

A conventional cutter wheel of this type is a disk member having a cutting edge along its outer periphery and formed with a circular mounting hole extending therethrough at its center. The cutter wheel is rotatably mounted to the head member of the glass cutter by a mounting shaft, which has a circular section and is inserted through the circular mounting hole.

For the cutting of liquid crystal plates, hard glass plates and ceramic glass plates, high degrees of accuracy in straightness and perpendicularity of the cut surface are required. To meet this requirement, it is necessary to form a slit that is sufficiently smooth, straight and deep. To form a deep slit, the wheel has to penetrate deep into the glass plate. However, none of the conventional cutter wheels can form such a deep slit because the mounting shaft and the mounting hole are both circular in section, and thus the wheel rolls smoothly on the glass plate without penetrating. Since the slit is shallow, it is difficult to form a perpendicular cut surface when the glass plate is broken along the slit.

An object of this invention is to provide a cutter wheel which can form a deep slit on an article to be cut so that the article can be broken easily along the slit and a perpendicular cut surface can be formed reliably.

SUMMARY OF THE INVENTION

According to this invention, there is provided a cutter wheel comprising a disk-shaped cutter wheel formed with a mounting hole extending therethrough along its axis and having an irregular shape so that the cutter wheel vibrates when it rolls.

Other features and objects of the present invention will become apparent from the following description made with reference to the accompanying drawings, in which:

BRIEF DESCRIPTION OF THE DRAWINGS

FIG. 1A is a front view of a cutter wheel embodying the invention;

FIG. 1B is a side view of the cutter wheel shown in FIG. 1;

FIG. 1C is an enlarged sectional view of a different cutting edge;

FIG. 2 is an enlarged sectional view showing the relationship between a mounting hole of the cutter wheel and a mounting shaft;

DETAILED DESCRIPTION OF THE PREFERRED EMBODIMENT

FIG. 1 shows a disk-shaped cutter wheel 1 having a cutting edge 2 along the outer periphery and formed with a mounting hole 3 extending therethrough along its central axis.

The cutting edge 2 of the cutter wheel 1 may be a V-shaped single-step edge as shown in FIG. 1B or a two-step edge as shown in FIG. 1C. One of the two types is selected according to the hardness of the material to be cut.

The cutter wheel 1 is made from a cemented carbide or a diamond crystal, and typically has an outer diameter of about 2–6 mm. The mounting hole 3 is shaped irregularly so that the wheel will vibrate while rotating. The illustrated mounting hole is hexagonal with each side arcuately convexed inwardly.

The mounting hole 3 may be of any polygonal shape depending on the thickness and material of the article to be cut. For example, it may be selected from among square to dodecagonal. The curvature of each side is not limited either.

FIG. 2 shows the relationship between a mounting shaft 4 rotatably supporting the cutter wheel 1 and the mounting hole 3. The outer diameter of the mounting shaft 4 is determined with respect to the minimum inner diameter of the mounting hole 3 such that the shaft 4 fits loosely in the hole 3.

Figure 3:
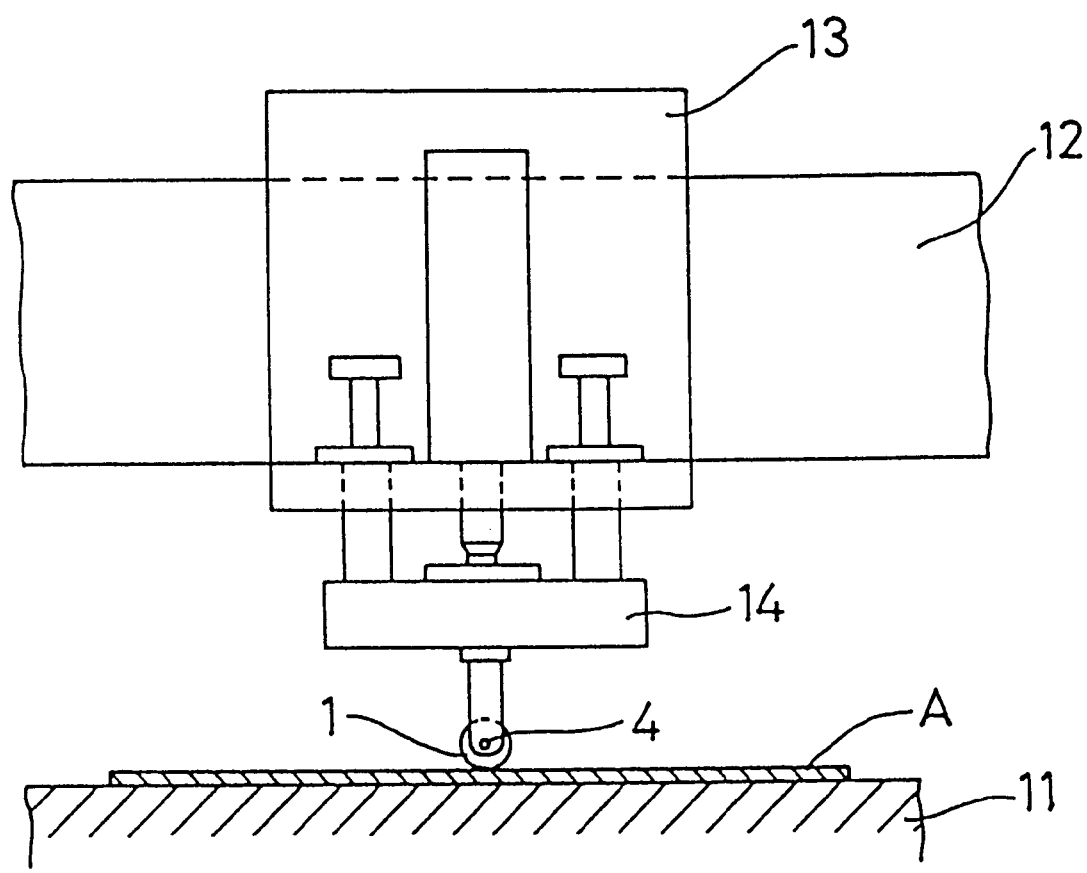
FIG. 3 is a partial front view of a cutter wheel embodying a glass cutting device using the cutter wheel.

FIG. 3 shows the cutter wheel 1 used in the glass cutting device. The glass cutting device comprises a table 11, an X-axis guide 12 movable in a Y-axis direction over the table 11, a cutter head 13 mounted on the X-axis guide 12 so as to be movable in an X-axis direction, and a holder 14 vertically movably mounted to the bottom of the cutter head 13 and having the mounting shaft 4 inserted through the mounting hole 3 of the cutter wheel 1 to rotatably support the wheel 1. By moving the X-axis guide 12 and the cutter head 13 with the cutter wheel 1 pressed against a glass plate A placed on the table 11 at a predetermined pressure, the cutter wheel 1 rolls on the glass plate A, thus forming a slit therein. The glass plate A is then broken along the slit.

Since the cutter wheel 1, mounted to the bottom of the holder 14 by means of the mounting shaft 4, has a polygonal mounting hole 3 of a non-circular shape, when the wheel rolls on the glass plate A, it vibrates due to steps between adjacent sides of the polygonal mounting hole. The cutting edge of the wheel can thus penetrate more deeply into the glass plate, so that a deeper and smoother slit can be formed in the glass plate A. This in turn makes it possible to more easily break the glass plate along the slit and to form a cut surface which is rectangular to the top surface of the glass plate.

Figure 4:
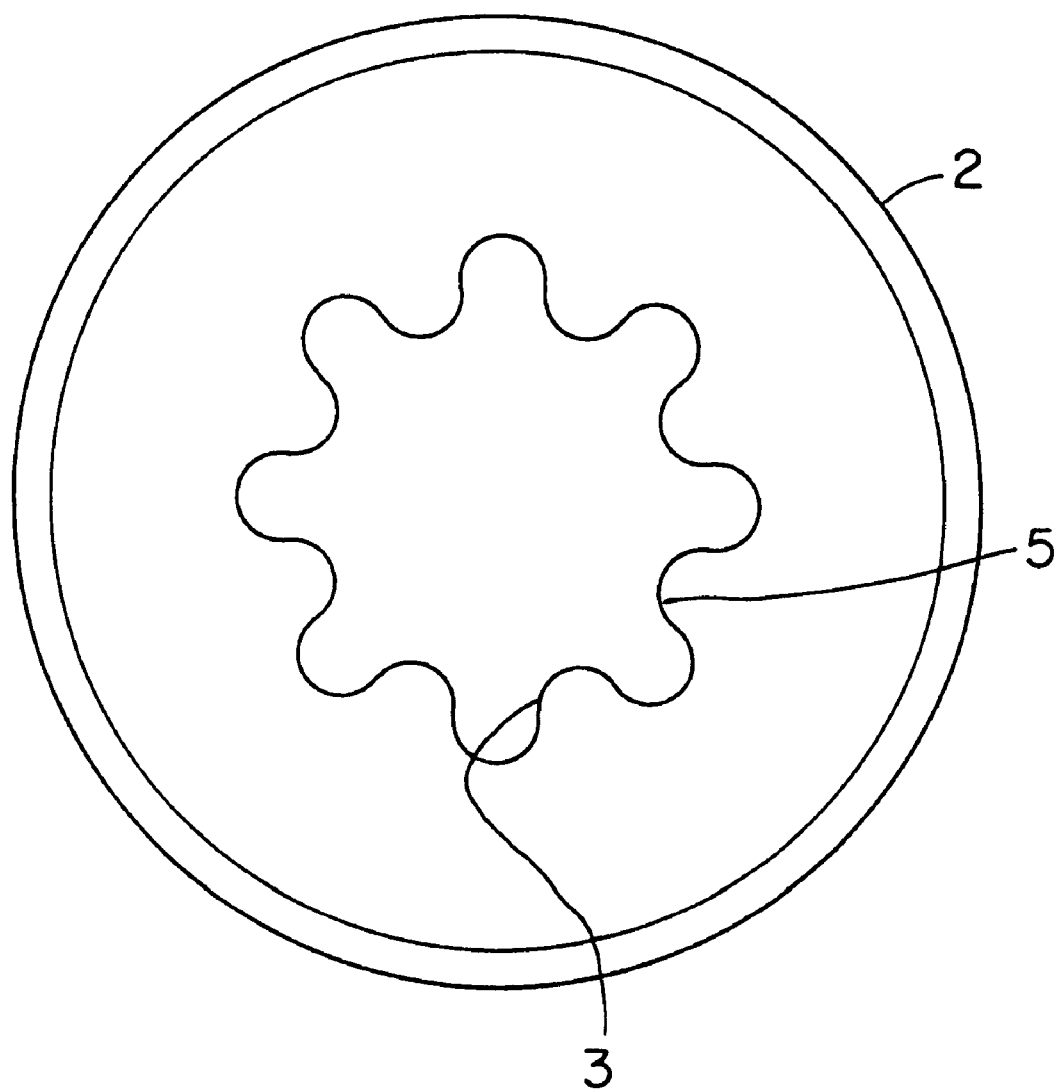
FIG. 4 is a front view of another embodiment of the present invention.

FIG. 4 shows another embodiment of a cutter wheel 1 having a mounting hole 3 which is octagonal with round corners 5.

What is claimed is:

1. A cutter comprising a disk-shaped cutter wheel having a cutting edge along its outer periphery, said cutter wheel being formed with a mounting hole having at least four arcuate inwardly convex protrusions on an inner periphery of said mounting hole, and a cylindrical shaft loosely inserted in said mounting hole.

2. An apparatus for cutting glass, said apparatus comprising:
a cutting wheel having a cutting edge formed along an outer periphery of said cutting wheel, and a non-circular mounting hole having five sides which each define an arcuate convex surface; and
a mounting shaft extending through said mounting hole, said mounting shaft having a circular cross section.

3. The apparatus for cutting glass as claimed in claim 2, wherein said mounting shaft is loosely fitted in said mounting hole so that, upon rotation of said cutting wheel, said shaft will collide against said arcuate convex surfaces and impart vibrations to said cutting wheel.

\* \* \* \* \*